May 5, 1970     C. J. BEER ET AL     3,510,196
LENS RETAINER WITH SKIRT AND BAYONET TYPE RING
Filed Feb. 28, 1967     2 Sheets-Sheet 1
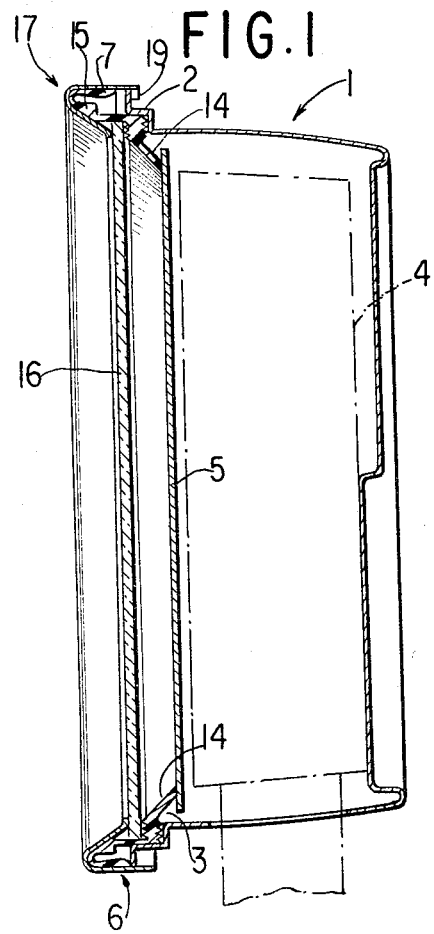
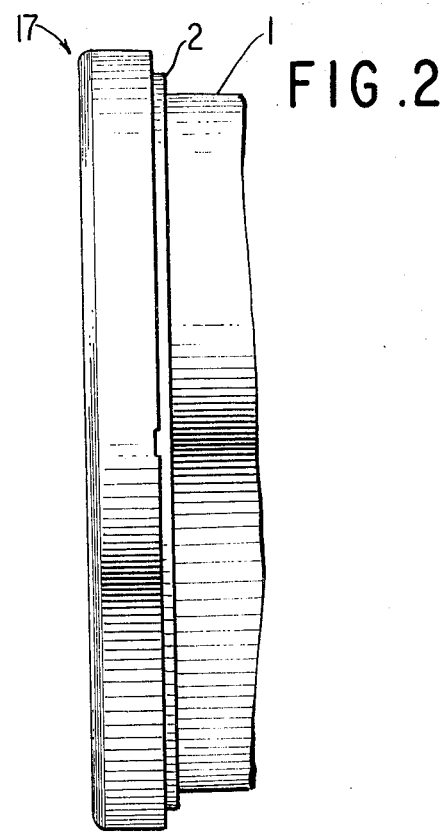
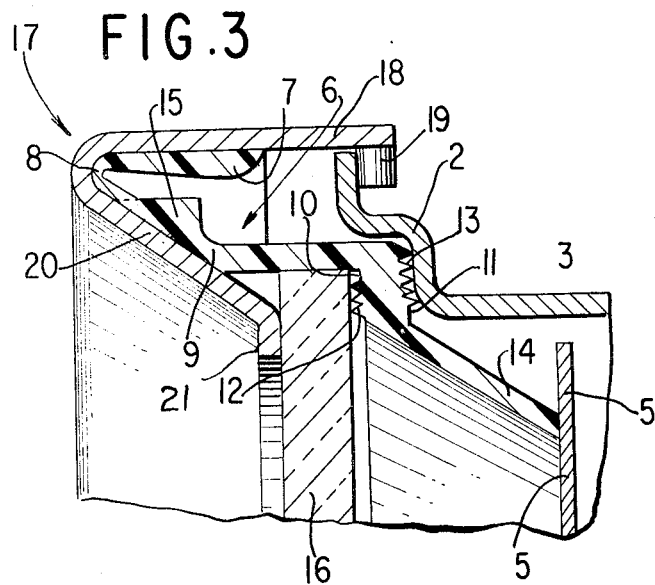
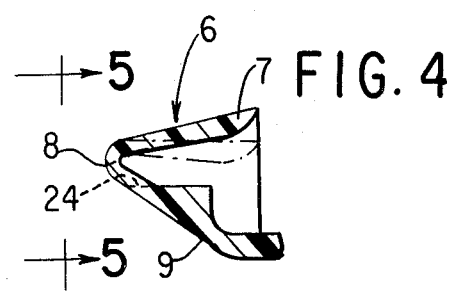
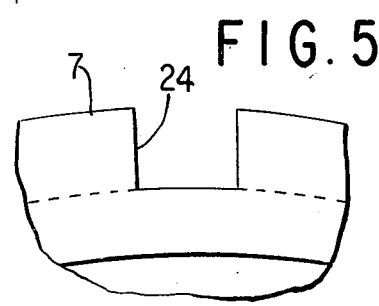
INVENTORS
CHARLES J. BEER
HARRY W. HOFF, JR.
BY Smythe & Moore
ATTORNEYS

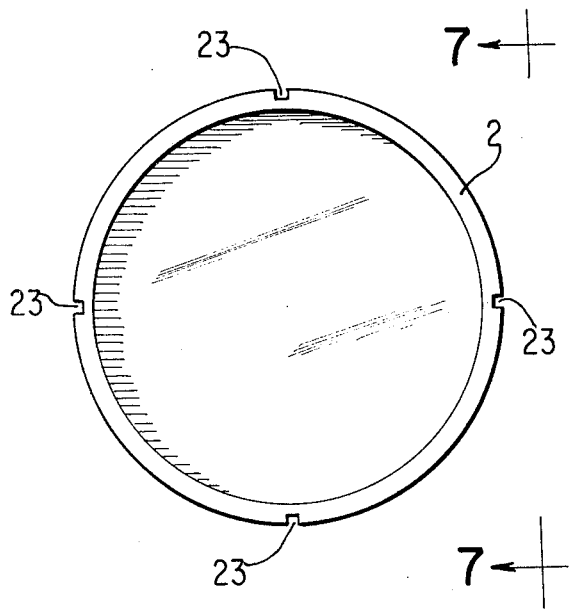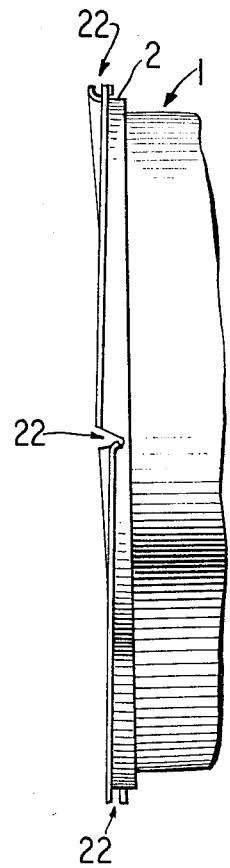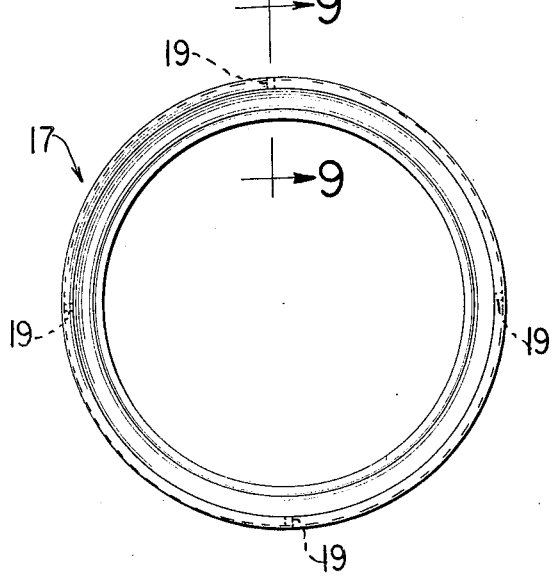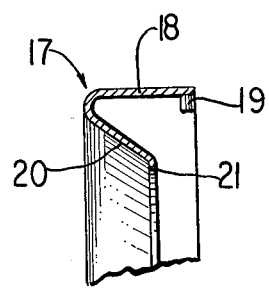

United States Patent Office 3,510,196
Patented May 5, 1970

3,510,196
LENS RETAINER WITH SKIRT AND BAYONET TYPE RING
Charles J. Beer, Sellersville, and Harry W. Hoff, Jr., Quakertown, Pa., assignors to Ametek, Inc., New York, N.Y., a corporation of Delaware
Filed Feb. 28, 1967, Ser. No. 619,469
Int. Cl. G02b 27/02, 7/02
U.S. Cl. 350—114                                                    6 Claims

ABSTRACT OF THE DISCLOSURE

An arrangement for securing a viewing lens to the front of an instrument casing having a dial with indicia, wherein the lens is held in position by a retainer having inwardly extending flanges and having a conical inwardly projecting member to close the space between the lens and the dial of the gauge.

---

This invention relates to an arrangement for sealingly securing a viewing lens to the opening of an instrument casing and more particularly to a resilient lens retainer fitted over the casing opening and having a shoulder against which is positioned the viewing lens with the lens being held in position by a retaining ring fitted over the lens retainer or bezel. The lens retainer has an inwardly projecting flange for sealingly engaging the lens and the case. There may be a conical shaped member depending from the inwardly projecting flange for closing the space therebetween and the dial face.

It is conventional practice to provide a closure arrangement for the opening of instrument cases which includes a transparent viewing lens or glass through which the instrument dial and pointer can be observed. Such a closure arrangement should seal the interior of the casing as much as possible but at the same time perimt ready removal of the closure for access to the inside of the casing. Various forms of sealing rings and retaining rings have been devised for sealing the viewnig lens to the casing opening and for retaining the lens and sealing ring in position. While some of these closure arrangements have provided good sealing of the instrument casing, their structures have been rather complicated and hence did not permit ready access to the interior of the cases. On the other hand, a closure arrangement which can be readily removed frequently did not provide proper sealing for the interior of the casing. Furthermore, it may be desirable to use various size mechanisms within a case.

One of the objects of the present invention is to provide a simplified lens mounting arrangement for an instrument casing which at the same time provides a tight seal and which is readily removable.

In one aspect of the present invention, the side wall of the instrument casing defines an opening having an external flange adjacent the opening. A resilient lens retainer or bezel of plastic or the like is formed to have diverging outer and inner skirt portions. The inner skirt portion is longer than the outer skirt portion and is formed with an annular shoulder therein, the shoulder extending inwardly. When the retainer is in position, the inner face of the shoulder rests against the external flange of the casing and the viewing lens is positioned against the outer face of the shoulder. A case ring has a substantially U-shaped cross section comprising an outer skirt portion which is cylindrical in form and an inner skirt portion diverging inwardly therefrom. The case ring is fitted over the lens retainer with the inner edge of the ring inner skirt portion bearing against the viewing lens to retain the same in position.

A bayonet arrangement is provided on the casing flange and on an inner flange of the outer skirt portion of the case or retaining ring. The bayonet connection enables the ring to be quickly rotated into position or removed from the casing as may be desired. Slots are provided in both the case ring flange and the lens retainer to accommodate the bayonet connection.

Other objects, advantages and features of the invention will be apparent from the accompanying description when taken in conjunction with the following drawings which are merely exemplary.

In the drawings:

FIG. 1 is a vertical sectional view of the instrument casing, lens retainer and case ring of the present invention;

FIG. 2 is a fragmentary view of the case ring portion of the instrument shown in FIG. 1;

FIG. 3 is a fragmentary enlarged vertical sectional view similar to that of FIG. 1, illustrating the structure of the closure arrangement of the invention;

FIG. 4 is a fragmentary sectional view showing the cross section of the bezel prior to the case ring being positioned thereover;

FIG. 5 is a fragmentary front view of a portion of the lens retainer, taken in the direction of the line 5—5 of FIG. 4;

FIG. 6 is a plan view of the opening of the instrument casing;

FIG. 7 is an elevational view of the casing as shown in FIG. 6 to illustrate the bayonet connection formed on the flange of the casing;

FIG. 8 is a plan view of the case ring used in the closure arrangement; and

FIG. 9 is a sectional view of the case ring taken along the line 9—9 of FIG. 8.

Proceeding next to the drawings wherein like reference symbols indicate the same parts throughout the various views, a specific embodiment of the invention will be described in detail.

As may be seen in FIG. 1, the instrument casing is indicated generally at 1 and is provided with an external flange 2 surrounding its open end 3. An instrument, such as a pressure gauge, is indicated generally at 4 and is enclosed within the casing. The instrument may be provided with a dial face 5 upon which indicia are mounted and above which a pointer actuated by the instrument moves.

The lens retainer of the present invention is indicated generally at 6 and is illustrated in FIGS. 3 and 4. The lens retainer is resilient and is formed of a suitable material such as polypropylene. The lens retainer comprises an outer skirt portion 7 which in its normal position tapers outwardly as shown in FIG. 4. Connected to one end of the outer skirt portion 7 at the junction 8 is an inner skirt portion 9 which tapers inwardly, such as shown in FIG. 3, to form a conical surface.

An annular shoulder having an inner face 10 and an outer face 11 is formed in the inner skirt portion with these faces being provided with resilient ridges 12 and 13, respectively, in order to sealingly engage the viewing lens and casing flange in a manner to be presently described.

The inner edge of the lens retainer 6 is indicated at 14 and extends inwardly of the casing flange to engage the dial face 5.

The inner surface of the inner skirt portion 9 is provided with an annular reinforcing ridge 15.

As shown in FIG. 3, the lens retainer is in its position with the outer face 11 of the annular shoulder resting against flange 2 of the instrument casing. A transparent viewing lens 16 is positioned against the outer face 10 of the annular shoulder of the lens retainer.

Positioned over the lens retainer is a retaining or case ring indicated generally at 17, comprising an outer skirt portion 18 which is cylindrical in form and has an internal flange with pins 19. Inclined inwardly from the outer skirt portion is an inner skirt portion 20 which is provided with an internal flange 21 resting against the viewing lens 16.

As may be seen in FIGS. 6 and 7, the instrument casing flange 2 is provided with a bayonet locking arrangement indicated at 22 and having spaced slots 23 therein. The locking arrangement 22 cooperates with a similar locking arrangement provided on the internal flange pins 19 of the case ring 17.

As shown in FIG. 5, the outer skirt portion 7 of the resilient lens retainer is provided with a plurality of longitudinal slots 24 coinciding with the spaced slots 23 of the casing flange 2 to enable the locking pins 19 to engage the bayonet locking surfaces 22 of the instrument casing.

As may be seen in FIG. 4, the normal or unflexed position of the outer skirt portion 7 of the lens retainer is tapered outwardly to define a conical surface. However, when the case ring is positioned over the lens retainer, the skirt portions of the case ring flex the corresponding skirt portions of the lens retainer to the positions shown in FIG. 3. Such a resilient flexing of the lens retainer outer skirt portion against the case ring outer skirt portion assists in rattle free retention of the lens in the ring when the ring is removed from the case.

In addition, by tightening down the case ring 17 by means of the bayonet connection, the flexible ribs 12 and 13 on the faces of the annular shoulder are compressed and form tight seals with the casing flange and viewing lens, respectively.

To remove the case ring 17 and the closure arrangement, it is only necessary to rotate the case ring in the opposite direction through an angle of approximately 90°. Removal of the case ring permits the viewing lens to be taken out and permits access to the dial face 5 of the instrument for calibration or for purposes of maintenance.

While other plastics and resilient materials may be used for the lens retainer, the physical and chemical characteristics of polypropylene make it ideally suited for the lens retainer 6 disclosed herein.

Thus, it can be seen that the present invention has provided a simple but effective arrangement for mounting a viewing lens in the opening of an instrument casing. Further, the mounting arrangement provides a tight seal to protect the interior of the casing from dirt but, at the same time, may be readily removed to permit access to the interior of the casing.

What is claimed is:

1. In an instrument casing having a side wall defining an opening, there being an external flange on said side wall adjacent said opening, a resilient lens retainer for said casing opening and adapted to support a viewing lens, said lens retainer having outer and inner diverging skirt portions, an annular shoulder on said inner skirt portion with the inner face thereof engaging said external flange and the viewing lens adapted to be positioned against the outer face of said shoulder, a case ring over the junction of said inner and outer skirt portions of said lens retainer, said case ring having a substantially U-shaped section comprising an outer cylindrical skirt portion and an inwardly directed inner skirt portion, said ring inner skirt portion bearing against said viewing lens, said ring outer and inner skirt portions fitting over the outer and inner skirt portions respectively of said lens retainer when in position, the outer skirt portion of said lens retainer being urged to a cylindrical position by the outer skirt portion of said case ring, and cooperating means on said ring and flange for releasably securing said ring on said flange.

2. In an instrument casing as claimed in claim 1 within the inner edge of said lens retainer inner skirt portion extends inwardly of said casing flange to engage a dial face of an instrument within said casing.

3. In an instrument casing as claimed in claim 1 and further comprising means on both faces of said annular shoulder to engage sealingly the viewing lens and external flange respectively.

4. In an instrument casing as claimed in claim 1 with there being an internal securing means on said case ring outer skirt portion, said securing means being spaced circumferentially on said ring and casing means.

5. In an instrument casing as claimed in claim 4 with there being radial notches in said case ring means to receive said securing means.

6. In an instrument casing as claimed in claim 4 with there being longitudinal slots in the outer skirt portion of said lens retainer for accommodating said securing means.

References Cited

UNITED STATES PATENTS

| 1,687,818 | 10/1928 | Wollensak | 350—257 |
| 2,826,118 | 3/1958 | Suzukawa | 350—277 |
| 3,122,962 | 3/1961 | De Angelis | 351—154 |
| 3,171,886 | 3/1965 | Holt et al. | 350—67 |
| 1,971,434 | 8/1934 | Trautmann | 350—267 |

PAUL R. GILLIAM, Primary Examiner

U.S. Cl. X.R.

350—65, 67, 242